United States Patent Office 3,400,130
Patented Sept. 3, 1968

3,400,130
SUBSTITUTED Δ⁸ - OCTAHYDROQUINOLINE-2,7 - DIONES AND THEIR 7 - ALKYLENE THIOKETALS
Arvin P. Shroff, Piscataway, N.J., assignor to Ortho Pharmaceutical Corporation, a corporation of New Jersey
No Drawing. Continuation-in-part of application Ser. No. 467,102, June 25, 1965. This application May 25, 1967, Ser. No. 641,130
8 Claims. (Cl. 260—289)

ABSTRACT OF THE DISCLOSURE

Δ⁸-octahydroquinoline-2,7-diones and their 7-alkylene thioketals are central nervous system stimulating agents.

The present application is a continuation-in-part of my copending application U.S. Ser. No. 467,102 filed June 25, 1965, now abandoned.

The compounds of the present invention exert central nervous system stimulating action in animals and in particular reduce hexobarbital sleeping time.

The following reaction scheme illustrates the present invention:

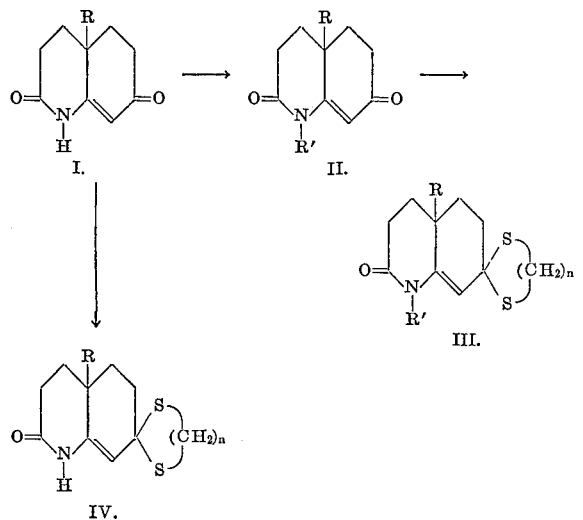

wherein R is selected from the group consisting of straight and branched chain, substituted and unsubstituted alkyl groups of from 1 to 10 carbon atoms, substituted and unsubstituted aryl groups and substituted and unsubstituted cycloalkyl groups of from 5 to 6 carbon atoms, R' is selected from the group consisting of straight and branched chain, substituted and unsubstituted alkyl groups of from 1 to 10 carbon atoms, substituted and unsubstituted cycloalkyl groups of from 5 to 6 carbon atoms, aralkyl groups, alkaryl groups, and heterocyclic groups and $n$ is the interger 2 or 3.

The 4a-substituted-Δ⁸-octahydroquinoline-2,7-diones (I) are prepared by a two-step procedure. The first step is the preparation of substituted pimelonitrile in accordance with the procedure of Bouson and Riener, JACS, 64, 5820, (1942). The second step is the conversion of the pimelonitrile to the corresponding 4a-substituted-Δ⁸-octahydroquinoline-2,7-dione in accordance with the procedure of Koelsch and Walker, JACS, 72, 346, (1950).

Typical 4a-substituted-Δ⁸-octahydroquinoline-2,7-diones (I) from which the novel compounds of the present invention are prepared include, but are not limited to:

4a-methyl-Δ⁸-octahydroquinoline-2,7-dione,
4a-ethyl-Δ⁸-octahydroquinoline-2,7-dione,
4a-n-butyl-Δ⁸-octahydroquinoline-2,7-dione,
4a-isobutyl-Δ⁸-octahydroquinoline-2,7-dione,
4a-2,3-dimethylbutyl-Δ⁸-octahydroquinoline-2,7-dione,
4a-3-methylpentyl-Δ⁸-octahydroquinoline-2,7-dione,
4a-n-heptyl-Δ⁸-octahydroquinoline-2,7-dione,
4a-3-ethylpentyl-Δ⁸-octahydroquinoline-2,7-dione,
4a-n-decyl-Δ⁸-octahydroquinoline-2,7-dione,
4a-cyclohexyl-Δ⁸-octahydroquinoline-2,7-dione,
4a-1,2-dichloropropyl-Δ⁸-octahydroquinoline-2,7-dione,
4a-1,3-dichloroheptyl-Δ⁸-octahydroquinoline-2,7-dione,
4a-phenyl-Δ⁸-octahydroquinoline-2,7-dione,
4a-benzyl-Δ⁸-octahydroquinoline-2,7-dione,
4a-p-toluoyl-Δ⁸-octahydroquinoline-2,7-dione, and
4a-p-tolyl-Δ⁸-octahydroquinoline-2,7-dione.

The novel N-substituted-4a-substituted-Δ⁸-octahydroquinoline-2,7-diones (II) of the invention are prepared by reacting the appropriate 4a-subsituted-Δ⁸-octahydroquinoline-2,7-dione (I) with an appropriate organic halide. Typical organic halides useful for this reaction include:

| | |
|---|---|
| benzyl halide | p-napthoyl halide |
| phenethyl halide | p-methoxybenzyl halide |
| methyl halide | progargyl halide |
| ethyl halide | 2-bromoacetylpyridine |
| allyl halide | 3-bromoacetylpyridine |
| vinyl halide | 4-bromoacetylpyridine |
| acetyl halide | 2-bromoethylpyridine |
| isovaleryl halide | 3-bromoethylpyridine |
| benzoyl halide | 4-bromoethylpyridine |

The novel N - substituted - 4a - substituted - Δ⁸ - octahydroquinoline-2,7-diones (II) and the 4a-substituted-Δ⁸-octahydroquinoline-2,7-dione (I) starting material can be converted to their respective novel 7-alkylenethioketals (III and IV) by reaction with the appropriate dithiols.

The following examples are for the purpose of illustration and are not to be construed as limitations of this invention:

Example I.—N-benzyl-4a-methyl-Δ⁸-octahydroquinoline-2,7-dione 20 grams of 4a - methyl - Δ⁸ - octahydroquinoline-2,7-dione is treated with 20 ml. of 30% alcoholic potassium hydroxide and 12.0 ml. of absolute alcohol. To the stirred mixture is added 75.0 ml. of benzyl chloride and the solution is refluxed for 2 hours. The solution is poured over ice-water and is then extracted with benzene. The organic layer is washed several times with 25% sulfuric acid followed by water and is dried over anhydrous sodium sulfate. The solvent is removed under reduced pressure to give an oil. The oil is recrystallized from benzene-pentane to yield 15.5 grams of N - benzyl - 4a-methyl-Δ⁸-octahydroquinoline-2,7-dione, M.P. 106-108°.
Calcd. for $C_{17}H_{19}NO_2$.—Theoretical: C, 75.81; H, 7.11; N, 5.20. Found: C, 75.93; H, 7.30; N, 5.47.

Example II.—N-(β-phenethyl)-4a-methyl-Δ⁸ octahydroquinoline-2,7-dione

The procedure of Example I is followed substituting phenethyl chloride for benzyl chloride to yield N-(β-phenethyl) - 4a - methyl - Δ⁸ - octahydroquinoline - 2,7 - dione, M.P. 84–85°.
Calcd. for $C_{18}H_{21}NO_2$.—Theoretical: C, 76.29; H, 7.47; N, 4.94. Found: C, 76.25; H, 7.69; N, 4.98.

Example III.—1,4a-dimethyl-Δ⁸-octahydroquinoline-2,7-dione 5.0 grams of a 4a - methyl - Δ⁸ - octahydroquinoline-2,7-dione is dissolved in 50 ml. of methanol and is treated with 5.0 grams of sodium methoxide. The solution is refluxed for one hour and is then treated with methyl iodide. Refluxing is continued for two hours and the solution is then poured into a large amount of water. It is extracted with benzene and the benzene layer is washed with water and dried over sodium sulfate. The benzene is evaporated and the oil obtained is recrystallized from benzene-hexane to give 1.7 grams of 1,4a-dimethyl-$\Delta^8$-octahydroquinoline-2,7-dione, M.P. 108–110°.

Calcd. for $C_{11}H_{15}NO_2$.—Theoretical: C, 68.37; H, 7.82; N, 7.25. Found: C, 68.32; H, 7.69; N, 7.55.

Example IV.—1-ethyl-4a-methyl-$\Delta^8$ octahydroquinoline-2,7-dione

The procedure of Example III is followed, substituting ethyl iodide for methyl iodide to yield 1-ethyl-4a-methyl-$\Delta^8$-octahydroquinoline-2,7-dione, M.P. 99.5–100°.

Calcd. for $C_{12}H_{17}NO_2$.—Theoretical: C, 69.54; H, 8.27; N, 6.76. Found: C, 69.31; H, 8.50; N, 6.73.

Following the procedures of the foregoing examples, the following compounds are prepared:

1,4a-diethyl-$\Delta^8$-octahydroquinoline-2,7-dione,
1,4a-di-n-butyl-$\Delta^8$-octahydroquinoline-2,7-dione,
N-methyl-4a-methylpentyl-$\Delta^8$-octahydroquinoline-2,7-dione,
N-cyclohexyl-4a-phenyl-$\Delta^8$-octahydroquinoline-2,7-dione,
N-allyl-4a-methyl-$\Delta^8$-octahydroquinoline-2,7-dione,
N-pyranyl-4a-phenyl-$\Delta^8$-octahydroquinoline-2,7-dione,
N-ethynyl-4a-ethyl-$\Delta^8$-octahydroquinoline-2,7-dione,
N-isobutoxy-4a-methyl-$\Delta^8$-octahydroquinoline-2,7-dione,
N-toluoyl-4a-phenyl-$\Delta^8$-octahydroquinoline,2,7-dione, and
N-(2-ethylpyridyl)-4a-methyl-$\Delta^8$-octahydroquinoline-2,7-dione.

Example V.—4a-methyl-$\Delta^8$-octahydro-2-quinolone 7-ethylene thioketal 2.5 grams of 4a-methyl-$\Delta^8$-octahydroquinoline-2,7-dione is dissolved in 30 ml. of methanol and is treated with 2.0 grams of pyridine hydrochloride and 2.2 ml. of ethanedithiol. The mixture is stirred for three hours at room temperature. The crystals formed are filtered and recrystallized from methanol to yield 2,3 grams of 4a-methyl-$\Delta^8$-octahydro-2-quinolone-7-ethylene-thioketal, M.P. 227–229°.

Calcd. for $C_{12}H_{17}NOS_2$.—Theoretical: C, 56.45; H, 6.71; N, 5.84. Found: C, 56.64; H, 6.68; N, 5.70.

Example VI.—N-ethyl-4a-methyl-$\Delta^8$-octahydro-2-quinolone-7-ethylenethioketal Following the procedure of Example V, but starting with N-ethyl-4a-methyl-$\Delta^8$-octahydroquinoline-2,7-dione, there is yielded N-ethyl-4a-methyl-$\Delta^8$-octahydro-2-quinolone-7-ethylene-thioketal, M.P. 144–146°.

Calcd. for $C_{14}H_{21}NOS_2$.—Theoretical: C, 59.32; H, 7.47; N, 4.94. Found: C, 59.18; H, 7.60; N, 5.25.

Following the procedures of Example V and VI, there are prepared:

4a-ethyl-$\Delta^8$-octahydro-2-quinolone-7-ethylenethioketal,
4a-benzyl-$\Delta^8$-octahydro-2-quinolone-7-ethylenethioketal,
4a-cyclohexyl-$\Delta^8$-octahydro-2-quinolone-7-trimethylenethioketal,
4a-3-chlorobutyl-$\Delta^8$-octahydro-2-equinolone-7-ethylenethioketal,
N-alkyl-4a-ethyl-$\Delta^8$-octahydro-2-quinolone-7-ethylenethioketal,
1,4a-diethyl-$\Delta^8$-octahydro-2-quinolone-7-ethylenethioketal, and
N-(2-ethylpyridyl)-4a-methyl-$\Delta^8$-octahydro-2-quinolone-7-ethylenethioketal.

The activity of the compounds of the invention as central nervous system stimulants is shown by their effect on the hexabarbital sleeping time of animals.

Example VII

Male rats of the Wistar strain weighing 30 to 45 grams are given orally N-benzyl-4a-methyl-$\Delta^8$-octahydroquinoline-2,7-dione at the dosage levels indicated below. The rats are treated intraperitoneally with sodium hexabarbital at a dosage of 125 mg./kg. of rat body weight. A group of rats similarly treated with sodium hexabarbital is used as a control.

| Dosage, mg./kg. body wt. | Average sleeping time in minutes | Percent reduction in sleeping time |
|---|---|---|
| 10 | 97.3 | 31 |
| 25 | 96.0 | 31.2 |
| 50 | 75.8 | 46.2 |
| Control | 141.0 | |

The ability of a compound to counteract a lethal dosage of a barbituate such as sodium pentobarbital is also a measure of its central nervous system stimulating effect. It is also an indication of utility in the treatment of overdoses of barbituates.

Example VIII

Male mice are treated intraperitoneally with the test compounds at the dosages indicated below. They are then treated intraperitoneally with sodium pentobarbital at the dosages indicated below. A control group of mice is treated intraperitoneally with sodium pentobarbital. Five mice are used in each test group. The $LD_{50}$ of sodium pentobarbital is shown in the Merck Index, Seventh Edition, page 783, to be i.p. in mice 130 mg./kg.

| Compound | Dose, mg./kg. body wt. | Dose of pentobarbital, mg./kg. body wt. | Number of animals surviving | Percent LD |
|---|---|---|---|---|
| N-benzyl-4a-methyl-$\Delta^8$-octahydroquinoline-2,7-dione | 25 | 130 | 3 | 40 |
| Do | 50 | 130 | 4 | 20 |
| Do | 100 | 130 | 0 | 0 |
| Do | 100 | 140 | 4 | 20 |
| 4a-methyl-$\Delta^8$-octahydro-2-quinolone-7-ethylenethioketal | 25 | 130 | 3 | 40 |
| Do | 50 | 130 | 3 | 40 |
| Do | 100 | 140 | 1 | 80 |
| Control | | 140 | 0 | 100 |

What is claimed is:
1. A compound of the formula:

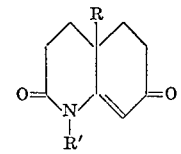

wherein R is selected from the group consisting of unsubstituted, straight chain alkyl groups of from 1 to 10 carbon atoms, and phenyl and R' is selected from the group consisting of saturated and unsaturated, lower alkyl substituted and unsubstituted, straight and branched chain alkyl groups of from 1 to 40 carbon atoms, lower alkyl substituted and unsubstituted cycloalkyl groups of 5 to 6 carbon atoms, lower alkyl substituted and unsubstituted mononuclear aryl groups, lower alkyl substituted and unsubstituted hydrocarbon carboxylic acyl groups, and benzyl and phenethyl groups.

2. N-benzyl-4a-methyl-$\Delta^8$-octahydroquinoline-2,7-dione.
3. N-($\beta$-phenethyl)-4a-methyl-$\Delta^8$-octahydroquinoline-2,7-dione.
4. 1,4a-dimethyl-$\Delta^8$-octahydroquinoline-2,7-dione.
5. N-ethyl-4a-methyl-$\Delta^8$-octahydroquinoline-2,7-dione.

6. A compound of the formula:

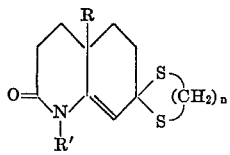

wherein R is selected from the group consisting of unsubstituted, straight chain alkyl groups of from 1 to 10 carbon atoms, and phenyl and R' is selected from the group consisting of hydrogen, lower alkyl substituted and unsubstituted, saturated and unsaturated, straight and branched chain alkyl groups of from 1 to 10 carbon atoms, lower alkyl substituted and unsubstituted cycloalkyl groups of 5 to 6 carbon atoms, lower alkyl substituted and unsubstituted mononuclear aryl groups, lower alkyl substituted and unsubstituted hydrocarbon carboxylic acyl groups, and benzyl and phenethyl groups, and $n$ is the integer 2 or 3.

7. 4a - methyl - $\Delta^8$ - octahydro - 2 - quinolone - 7- ethylene thioketal.

8. N - ethyl - 4a - methyl - $\Delta^8$-octahydro-2-quinolone-7-ethylene thioketal.

References Cited

UNITED STATES PATENTS 2,858,319  10/1958  Georgian _____ 260—289 X

NICHOLAS S. RIZZO, *Primary Examiner.*

D. DAUS, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,130 September 3, 1968

Arvin P. Shroff

It is certified that error appears in the above identified patent and that said Letters Patent are hereby corrected as shown below:

Column 4, line 64, "40" should read -- 10 --.

Signed and sealed this 27th day of January 1970.

(SEAL)
Attest:

Edward M. Fletcher, Jr.

Attesting Officer

WILLIAM E. SCHUYLER, JR.

Commissioner of Patents